United States Patent Office 2,794,832
Patented June 4, 1957

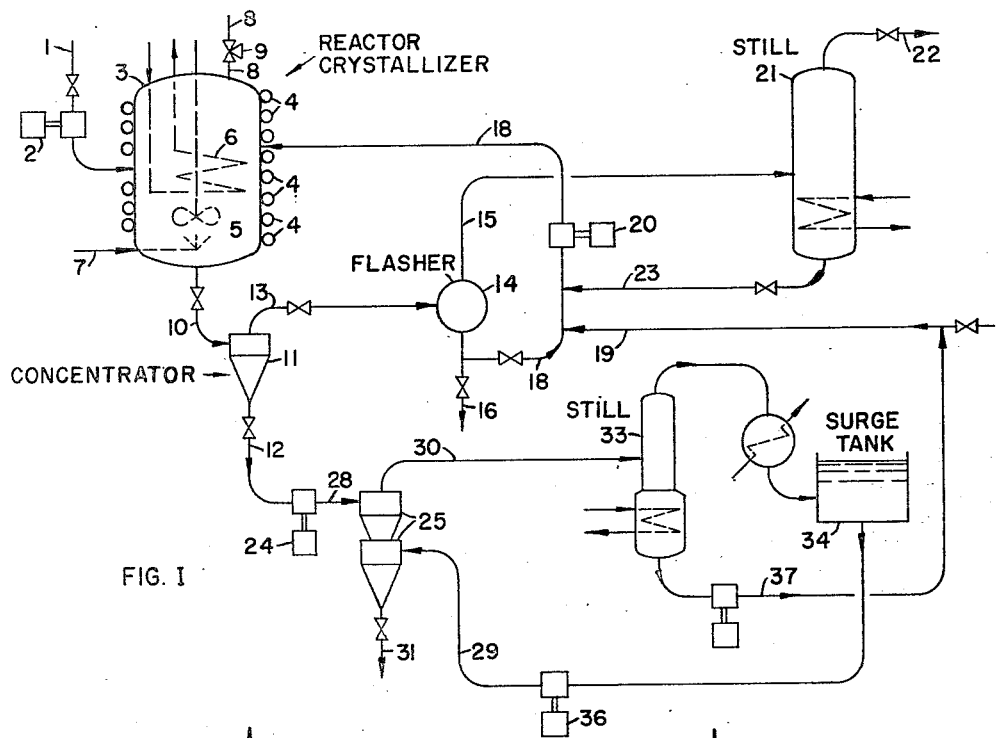
FIG. I
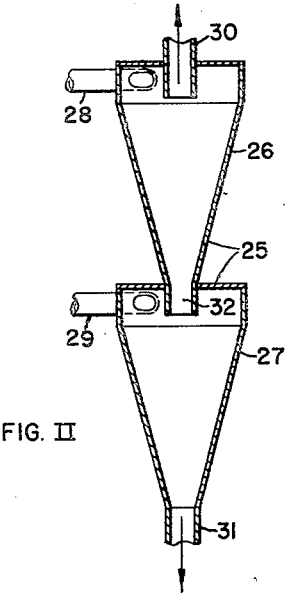
FIG. II
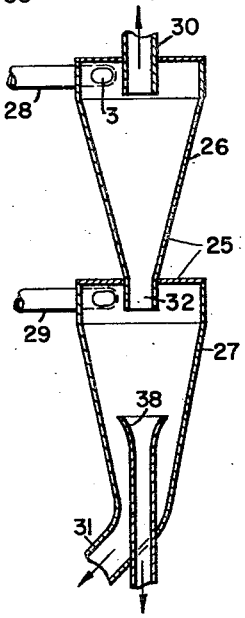
FIG. III
INVENTOR
KORNELIS RIETEMA

2,794,832

CRYSTALLIZATION AND SEPARATION OF CRYSTALS

Kornelis Rietema, Amsterdam, Netherlands, assignor to Shell Development Company, New York, N. Y., a corporation of Delaware Application June 20, 1955, Serial No. 516,744

3 Claims. (Cl. 260—525)

This invention relates to crystallization and separation of crystals from the mother liquor.

In chemical processes involving crystallization the problem arises of obtaining the crystal product as pure as possible and usually substantially free of the mother liquor. Also the problem arises of effecting suitable recovery of the crystal product as rapidly and economically as possible. This latter is particularly the case when producing large volumes of bulk chemicals such, for example, as ammonium sulfate for fertilizer, terephthalic acid, etc. since in these cases the separation cost normally represents a substantial portion of the total manufacturing cost.

In crystallization processes the product produced in the crystallizer normally consists of crystals of a range of sizes. The fine crystals in particular tend to make difficult the recovery of a product of high purity and complicate the recovery process. In some processes this problem is partly overcome by separating and recovering primarily only the larger crystals while cycling the smaller crystals back to the crystallization zone where they serve as seeds.

One method known for making a crude separation between the larger crystals and the smaller crystals is to pass the slurry of crystals in mother liquor through a vortex zone, for instance a so-called hydrocyclone. In this method the slurry is injected tangentially into the vortex zone. Due to the centrifugal force the larger crystals are thrown to the outer wall of the vortex chamber and are withdrawn in the so-called underflow stream while the smaller crystals in suspension in mother liquor are withdrawn axially from the vortex zone in the so-called overflow stream. This method, while it has some advantages, is capable of only a crude separation and still leaves the problem of separating a desirable product from the underflow stream. If the centrifugal field in the vortex chamber is retained low by the use of a low liquid velocity mainly the larger crystals are removed in the underflow but considerable mother liquor is also withdrawn so that the concentration of crystals in the underflow is not much greater than in the feed to the vortex zone. If, on the other hand, the centrifugal field is increased to produce a more concentrated underflow this stream contains all but the very finest crystals as well as the larger crystals and the recovery problem is not much simplified.

The process of the present invention overcomes to a large extent the mentioned difficulty and problems. Also it has the considerable advantage that, compared to older methods involving centrifuges, vacuum filters and the like, it allows an enormous production capacity with much simpler and much less costly equipment. In the method of the invention in broad outline the slurry of crystals in mother liquor from the crystallization zone, either as is or after preliminary concentration, e. g., through the use of a hydrocyclone, is passed serially through two cooperating vortex zones preferably in axial alignment and so arranged that it enters the first or upper vortex zone tangentially and enters the second or lower vortex zone axially. The centrifugal field in the second or lower vortex zone is created by the tangential injection of a second fluid which passes axially through the first vortex zone underflow stream and then through the first vortex zone, being withdrawn with the overflow thereof. With this arrangement the larger crystals are separated substantially free of smaller crystals and also substantially free of mother liquor all in one exceedingly rapid operation.

The process of the invention will be described in more detail with reference to the accompanying drawing and to specific examples.

Figure I of the accompanying drawing illustrates more or less diagrammatically a flow diagram with pertinent apparatus for affecting the continuous crystallization and separation of larger crystals of terephthalic acid.

Figure II is a diagrammatic illustration of the double vortex arrangement such as indicated by reference numeral 25 in Figure I.

Figure III is a diagrammatic illustration of a modified double vortex arrangement which may be used in place of that shown in Figure II in some instances.

The particular process used to illustrate the invention involves the production of terephthalic acid by air oxidation of paradialkyl benzene in a medium consisting mainly of acetic acid. The preferred starting material is para-diisopropyl benzene. However, other para-dialkyl benzenes and certain known halogenated derivatives may be used.

Referring to Figure I, para-diisopropyl benzene and if necessary an additional amount of fresh oxidation catalyst and/or a quantity of fresh solvents and/or diluent is led by means of pump 2 via valve line 1 into the reaction vessel 3 which in this case also serves as the crystallizer. This vessel is surrounded by an electric heating coil 4 insulated from the metal reaction vessel and provided with exterior insulation to prevent excessive external radiation. The heating wire 4 is shown diagrammatically. The vessel is also provided with a stirrer 5 and a cooling coil 6 through which a cooling liquid such as water can be circulated.

Oxygen or an oxygen containing gas is introduced into the reactor via line 7. Unused gas is led off via line 8 provided with a pressure reducing valve 9. Devices for measuring or regulating the temperature and pressure will, of course, usually be provided but for the sake of simplicity, these are not shown in the drawing.

The reaction product, which in this case is a slurry of terephthalic acid crystals in the liquid reaction medium, is drawn off from the reactor 3 via the valved line 10 and introduced tangentially into the hydrocyclone 11 which in this case acts merely as a concentrator and can be omitted. A concentrated suspension of the terephthalic acid product (slurry) is withdrawn via valved line 12 while the bulk of the mother liquor is withdrawn via valved line 13. This latter stream is preferably passed to a flasher 14. Water, usually containing some volatile by-products formed during the oxidation, is separated from the liquor in flasher 14 and is removed overhead via line 15. The bottoms product can be withdrawn via valved line 16 but is preferably recycled to the reaction vessel via line 18. A valved line 19 is provided for the addition of an extra quantity of liquid such for instance as the addition of a fresh quantity of diisopropyl benzene and/or fresh catalyst and/or a fresh quantity of solvent and/or diluent.

The flasher 14 may be omitted in those cases in which it is not required to remove water. In the case of the production of terephthalic acid, however, water is formed and it is generally preferable to maintain its concentration low by its periodic or continuous removal. The water content can be reduced by adding a water binding agent, When the liquid medium consists largely of a lower aliphatic carboxylic acid, it is preferable to use as water binding agents anhydrides of lower aliphatic carboxylic acids, preferably having no more than about 4 carbon atoms in the molecule. By absorption of water these compounds are converted into the carboxylic acids which are useful as solvents in the process.

If desired, mixtures of anhydrides of various carboxylic acids and/or mixed anhydrides may be used. It is often most advantageous to use only anhydrides of carboxylic acids which are already present in the reaction mixture. However, for reasons of economy acetic anhydride is usually preferred even when the solvent is a homologue of acetic acid such as propionic acid and butyric acid.

When using acid anhydrides of lower carboxylic acids, especially acetic anhydride, as water binding agents the presence of an excess of an anhydride in the reaction mixture should be avoided.

A particularly advantageous method of separating undesirable water and also in many cases to obtain valuable by-products comprises distilling the liquid to be recycled. Thus in the example in question the liquid withdrawn from the flasher 14 via line 15 is passed to a distillation column 21. From this distillation column (stripper) water, usually containing some volatile reaction products, is withdrawn overhead via valved line 22. The bottom product, which consists of the oxidizable material and/or solvent, is passed via valved line 23 to line 18 back to the reaction vessel 3.

In a typical example the reactor was filled with a mixture of 6,000 parts by weight of acetic acid and 1500 parts by weight of para-diisopropyl benzene to which 6 parts by weight of manganese acetate and 9 parts by weight of cobalt acetate were added. The reaction vessel was closed and heated to 170° C. under a pressure of 20 kg./cm.$^2$ (gauge). Air was then introduced at a rate of 800 parts by weight per hour while the stirrer was rotated at a rate of 1200 R. P. M. Circulation of the liquid through the fractionating column 21 was begun in order to remove the water of reaction.

After 6 hours fresh para-diisopropyl benzene, fresh catalyst and also some fresh acetic acid were added at intervals to the reaction mixture. The process was then carried out in a continuous manner, the conditions prevailing being as follows:

Temperature in the reaction vessel—170° C.
Pressure in the reaction vessel—20 kg./cm.$^2$ (gauge)

After 3 hours there was added a mixture containing:

Para-diisopropyl benzene—210 parts by weight
Acetic acid—210 parts by weight
Manganese acetate—0.84 parts by weight
Cobalt acetate—0.84 parts by weight
Temperature at top of column 21—105° C.

Average compositions of overhead from column 21:

Acetic acid—65% by weight
Water—20% by weight
Metal acetate—6% by weight
Formaldehyde—1.5% by weight
Formic acid—7.5% by weight
Liquid recycled to reaction vessel—6000 parts by weight/hour
Terephthalic acid recovered—50 parts by weight/hour The reaction mixture withdrawn from the reaction vessel via line 10 contained approximately 1% terephthalic acid in the form of crystals up to about 50 microns diameter, mainly between 3 microns and 50 microns. This slurry was injected tangentially into the hydrocyclone 11 wherein it was concentrated to a suspension containing approximately 9% terephthalic acid which was drawn off via line 12.

Referring again to Figure I, the suspension, which in this case was concentrated in hydrocyclone 11, is passed by line 12 and pump 24 to the upper vortex zone of the double vortex apparatus 25 such as illustrated more clearly in Figure II.

Referring to Figure II, the apparatus comprises two axially arranged vortex chambers 26 and 27 provided with tangential lines 28 and 29, respectively. The overflow of the upper vortex is the centrally located line 30. The underflow of the lower vortex is at 31. The axial constricted communication 32 between the two zones is both the underflow of the upper vortex and the overflow of the lower vortex. The suspension of crystals in mother liquor from line 12 is passed by pump 24 and line 28 tangentially into the upper or first vortex zone. The mother liquor passes through the overflow 30 along with at least part of the washing fluid and most of the finer crystals as will be further explained. A washing fluid, which in the particular case in question is methanol, is introduced tangentially into the second or lower vortex by line 29. The wash liquid containing mother liquor removed from the crystals passes through overflow 32 (which is also the underflow of the first vortex zone) and then through the upper vortex zone being withdrawn in admixture with the mother liquid being discharged through the overflow 30. The washing liquid passing counter-current through the crystals in the underflow-overflow 32 removes and carries with it most of the fine crystals. The larger crystals washed substantially free of mother liquor are removed by the underflow 31 along with some wash liquid. The wash liquid thus removed with the crystals may be removed by evaporation, filtration, or other means not shown. In the particular case in question the mixture is passed to an esterifier (not shown) to produce the methyl ester of terephthalic acid.

The mixture of mother liquor and washing fluid withdrawn by the overflow 30 may be handled in various ways. In the particular example in question this mixture is passed to a fractionator 33 wherein the methanol is flashed off and removed overhead. The recovered methanol may be recycled from a storage tank 34 back to the second vortex zone, e. g., by line 29 and pump 36. The bottoms product from the fractionator 33 may be recycled to the crystallizer 3 by lines 37, 19 and 18.

In some cases, especially where large amounts of wash liquid are required, the apparatus of Figure II may be modified as shown in Figure III. This double vortex apparatus is similar to that shown in Figure II except that it is provided with a second axially located overflow 38. In this apparatus part of the wash liquid may be withdrawn through this lower overflow 38 instead of withdrawing all of it through the upper overflow 32. The washed crystals as before are removed with underflow via 31.

While the invention has been described with particular reference to the production of terephthalic acid by air oxidation in an acetic acid medium, it is to be understood that it is not limited thereto. For example, it is also applicable to the production of terephthalic acid by direct oxidation of monochloroxylene in alkaline aqueous suspensions under high pressure.

The washing fluid is usually a liquid having a density lower than that of the crystals to be separated. In some applications a gaseous fluid such as steam may be used in place of a liquid for this purpose. In the case of the separation of terephthalic acid produced by oxidation, the product usually contains small to appreciable amounts of para-toluic acid. This latter product is considerably more soluble in water than the terephthalic acid at temperatures of the order of 170 to 220° C. By using water or a mixture of water and steam at these temperatures as the washing fluid paratoluic acid if present is largely dissolved and may be separately recovered from the used wash liquid by simply cooling it. Other materials such as tetrachloroethane may be used in the wash liquid and have the advantage that they serve as inert diluents in the crystallization zone.

The process of the invention although particularly suited for the production of terephthalic acid and similar materials is not limited thereto. It may be advantageously used for other crystallization processes such for example as the production of non-packing soda ash, the production of borax from colemanite, and similar processes where a relatively pure well crystallized product substantially free of fine material is desired. For example, in the production of ammonium sulfate from ammonia and spent sulfuric acid, gaseous ammonia was passed into a sulfuric acid solution containing 77% by weight $H_2SO_4$ while removing the heat of reaction until the acid ammonium sulfate was formed. The suspension of acid ammonium sulfate was passed to a second reactor in which the conversion to the neutral salt was effected by the addition of further amounts of ammonia while removing the heat of reaction. The ammonium sulfate was separated in the form of crystals ranging up to about 500 microns diameter. The resulting slurry containing approximately 8% by weight ammonium sulfate crystals, either with or without prior concentration, can be treated in the manner described to recover an ammonium sulfate product substantially free of crystals having a diameter less than about 30 microns.

As pointed out above, the process is particularly desirable for the production of such bulk materials of relatively low value where the cost of separation plays a major role in the economics of the process. The double vortex apparatus used in the present process, which incidentally does not need to be in vertical arrangement, is small and inexpensive and has no moving parts, but nevertheless has an enormous through-put capacity.

I claim as my invention:

1. Process for crystallization and crystal separation which comprises crystallizing a solid from a mother liquor in a crystallization zone, withdrawing from the crystallization zone a slurry of crystals in mother liquor, passing said slurry at a high velocity substantially tangentially into a vortex zone, withdrawing by gravity a concentrated slurry of crystals from the bottom of said vortex zone directly into a second vortex zone near the axis thereof, separately introducing tangentially into said second vortex zone a washing fluid separable from said mother liquor, withdrawing from the bottom of said second vortex zone coarse washed crystals, passing washing fluid carrying finer crystals axially up from said second vortex zone through said first vortex zone and withdrawing the same in admixture with mother liquor from the upper axis of said first vortex zone, separating washing fluid free of crystals from the last said mixture, and returning the separated washing fluid at least in part to the second vortex zone as said above.

2. Process for crystallization and crystal separation which comprises crystallizing a solid from a mother liquor in a crystallization zone, separating the bulk of the mother liquor from a slurry of fine and coarse crystals in a minor part of said mother liquor, passing said slurry at a high velocity substantially tangentially into a vortex zone, withdrawing by gravity a concentrated slurry of crystals from the bottom of said vortex zone directly into a second vortex zone near the axis thereof, separately introducing tangentially into said second vortex zone a washing fluid separable from said mother liquor, withdrawing from the bottom of said second vortex zone coarse washed crystals, passing said washing liquid carrying finer crystals axially up from said second vortex zone through said first vortex zone and withdrawing the same in admixture with mother liquor from the upper axis of said first vortex zone, separating washing fluid free of crystals from the last said mixture, and returning the separated washing fluid at least in part to the second vortex zone as said above.

3. Process for crystallization and separation of terephthalic acid which comprises crystallizing terephthalic acid from an aqueous acetic acid solution in a crystallization zone, continuously withdrawing from the crystallization zone a slurry of terephthalic acid crystals in aqueous acetic acid, passing said slurry at a high velocity substantially tangentially into a vortex zone whereby it is separated into a concentrated slurry containing mainly the larger crystals and a dilute slurry containing mainly the smaller crystals, withdrawing the concentrated slurry of terephthalic acid crystals from the bottom of said vortex zone into a second vortex zone near the axis thereof, separately introducing methanol tangentially into said second vortex zone, withdrawing from the bottom of said second vortex zone coarse washed crystals of terephthalic acid, passing said methanol carrying finer crystals of terephthalic acid axially up from said second vortex zone through said first vortex zone and withdrawing the same axially from the first vortex zone in admixture with said aqueous acetic acid, separating methanol free of terephthalic acid crystals from the last said mixture, and returning the separated methanol at least in part to the second vortex zone as said above.

References Cited in the file of this patent

UNITED STATES PATENTS

| | | |
|---|---|---|
| 2,479,067 | Gresham | Aug. 16, 1949 |
| 2,590,691 | Fontein | Mar. 25, 1952 |
| 2,636,899 | Burrows et al. | Apr. 28, 1953 |

OTHER REFERENCES

Tangel et al.: Chem. Engineering, vol. 62 (June 1955), pp. 234–38.